Sept. 26, 1967   R. P. OGDEN   3,344,305
TANDEM DRIVE WELDING WIRE FEED ARRANGEMENT FOR
SEMI-AUTOMATIC WELDING EQUIPMENT
Filed Dec. 6, 1965   4 Sheets-Sheet 1

INVENTORS
RALPH P. OGDEN
WILLIAM P. LAWSON
BY
Mann, Brown & McWilliams
ATTORNEYS

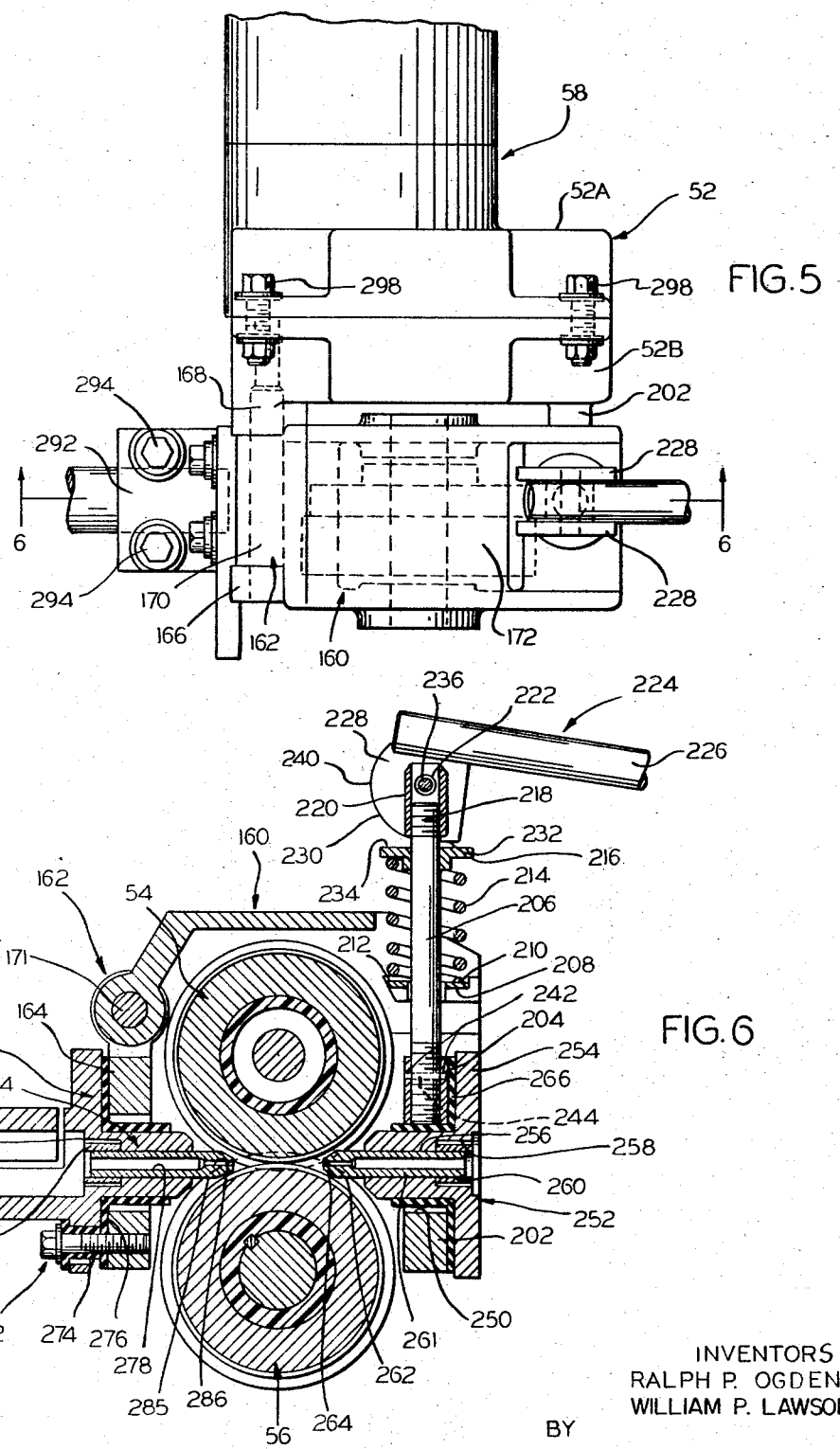

Sept. 26, 1967  R. P. OGDEN  3,344,305
TANDEM DRIVE WELDING WIRE FEED ARRANGEMENT FOR
SEMI-AUTOMATIC WELDING EQUIPMENT
Filed Dec. 6, 1965  4 Sheets-Sheet 3

INVENTORS
RALPH P. OGDEN
WILLIAM P. LAWSON
BY
Mann, Brown McWilliams
ATTORNEYS

Sept. 26, 1967 R. P. OGDEN 3,344,305
TANDEM DRIVE WELDING WIRE FEED ARRANGEMENT FOR
SEMI-AUTOMATIC WELDING EQUIPMENT
Filed Dec. 6, 1965 4 Sheets-Sheet 4

INVENTORS
RALPH P. OGDEN
WILLIAM P. LAWSON
BY
Mann, Brown & McWilliams
ATTORNEYS

United States Patent Office 3,344,305
Patented Sept. 26, 1967

3,344,305
TANDEM DRIVE WELDING WIRE FEED ARRANGEMENT FOR SEMI - AUTOMATIC WELDING EQUIPMENT
Ralph P. Ogden and William P. Lawson, Hammond, Ind., assignors to Ogden Engineering Corporation, a corporation of Indiana
Filed Dec. 6, 1965, Ser. No. 511,933
15 Claims. (Cl. 314—69)

ABSTRACT OF THE DISCLOSURE

A welding wire feed arrangement for supplying welding wire from a source of supply, such as a reel, to a welding gun over long distances, involving a push-pull driving arrangement in which the pusher drive unit that is located adjacent the source of welding wire supply applies a constant force pushing action on the wire that is independent of speed, while the puller drive unit is located adjacent the welding gun and controls the speed of wire feed to the gun. The pusher unit may be driven electrically or hydraulically and preferably is arranged to permit quantitative adjustment of the pushing force applied to the wire. The puller unit in the form disclosed is driven electrically with speed adjustments being made through control knobs at the power source or on the puller unit itself or on the welding gun to provide the desired rate of welding wire feed to the arc. This arrangement makes it possible to weld at distances on the order of one hundred feet or more from the welding machine.

Our invention relates to a tandem drive welding wire feed arrangement for feeding welding wire to the welding gun of semi-automatic welding equipment.

In conventional welding apparatus of the semi-automatic type, the operator holds and manipulates the welding gun during the welding operation. The gun is connected to the welding machine by an insulated flexible tubular conduit through which welding wire is fed to the gun.

While equipment of this general type is intended to give the operator freedom to move about in performing the welding functions while retaining many of the automatic features of automatic welding equipment, this freedom of movement has heretofore been limited to about ten feet from the welding machine, primarily due to the inability of the welding wire feed drive to efficiently feed the welding wire through its guide beyond distances of this dimension.

This limitation on the range of movement of the operator has severely restricted use of semi-automatic welding equipment to the extent that stick electrode equipment still comprises about seventy-five percent of the hand operated gun type equipment now in use.

A principal object of this invention is to provide a welding wire feed arrangement for semi-automatic equipment that permits the operator to weld at distances on the order of 100 feet or more from the welding machine.

Another principal object of the invention is to provide a tandem drive arrangement for feeding welding wire to guns of semi-automatic welding equipment in which a pusher drive assembly located adjacent the wire storage reel of the welding machine applies a uniform torque (that preferably is adjustable) to the wire, and a puller drive assembly located adjacent the gun feeds the wire to the gun at the speed desired by the operator.

Another principal object of the invention is to provide a welding wire feed assembly in which wire is engaged by opposing drive rings coupled to the source of motive power through electrically insulating hubs on which the rings are mounted, and which include geared portions that are in meshing relation.

Other objects of the invention are to provide a welding gun carried control arrangement for permitting the operator to control the rate of welding wire feed and welding voltage in his welding position, to provide a welding wire feed assembly arrangement that may be used for both the pusher and puller assemblies, and to provide a welding wire feed arrangement that is economical of manufacture, convenient in use, and readily adapted for use in connection with conventional forms of welding machines.

Other objects, uses, and advantages will be obvious or become apparent from a consideration of the following detailed description and the application drawings.

In the drawings:

FIGURE 5 is a plan view of the arrangement shown in FIGURE 4;

FIGURE 6 is a fragmental cross-sectional view substantially along line 6—6 of FIGURE 5;

However, it is to be understood that the specific drawing illustrations provided are supplied primarily to comply with the requirements of the patent code and the invention may have other specific embodiments that will be obvious to those skilled in the art.

General arrangement

Figure 1:
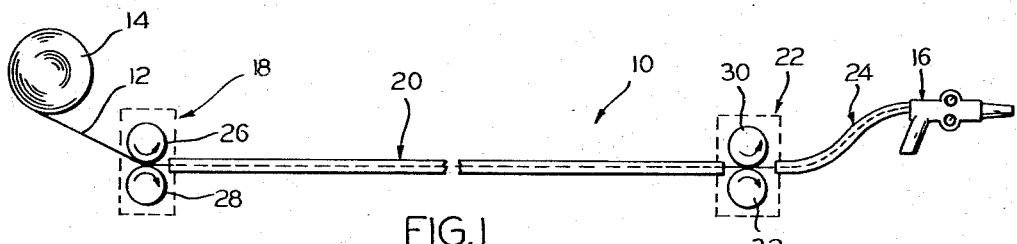
FIGURE 1 is a diagrammatic view illustrating in outline form the principal components of the present invention.

Reference numeral 10 of FIGURE 1 diagrammatically illustrates a tandem welding wire drive arrangement in accordance with this invention that is employed for feeding a welding wire 12 from its storage reel 14 to a welding gun or torch indicated at 16.

The arrangement 10 generally comprises a pusher drive assembly 18 that draws the welding wire 12 from its reel 14 and feeds it into an elongate flexible guide conduit 20 which extends to puller drive assembly 22 that in turn feeds the welding wire to the gun or torch 16 through a flexible conduit 24 that extends between assembly 22 and the gun 16.

The pusher drive assembly 18 comprises a pair of drive rollers 26 and 28, while the puller assembly 22 comprises a pair of drive rollers 30 and 32. The drive rollers 26, 28, 30 and 32 are rotated in the directions indicated by their corresponding arrows to effect the welding wire feeding action that is contemplated by this invention, and in accordance with this invention, the portions thereof that engage the wire 12 are electrically insulated from the remaining components of the respective assemblies 18 and 22.

In accordance with this invention, the pusher drive assembly 18 is arranged so that its drive rollers 26 and 28 apply a constant torque feeding action (which is preferably adjustable quantitatively as hereinafter disclosed) on the welding wire 12 that is independent of the speed of feed to the gun 16, while the puller assembly 22 is arranged so that its rollers 30 and 32 control the speed of welding wire feed to the gun 16 which includes supplying a pulling force on wire 12 to move it through the adjacent portion of conduit 20 and to supply a pushing force on the wire 12 to move it between assembly 22 and gun 16. It may be mentioned at this point that the function of assembly 18 is primarily to push welding wire into the adjacent portion of conduit 20 since very little pulling action on wire 12 is required to draw it off reel 14.

Furthermore, it is preferred that the gun 16 be provided with a finger operated control dial 34 that is electrically connected with the assembly 22 in any suitable manner so that the operator at the point of welding may control the rate of feed of the welding wire (related to welding amperage). We also prefer that finger control dial 36 be provided for controlling the voltage of welding current. Dials 34 and 36 may be arranged in any suitable manner for ready manipulation by the gun operator.

The arrangements described in connection with FIGURES 1 and 2 permit the tubular conduit 20 to have a length on the order of 100 feet or more with the result that the range of movement of the operator is greatly extended over conventional semi-automatic welding equipment.

Figure 2:
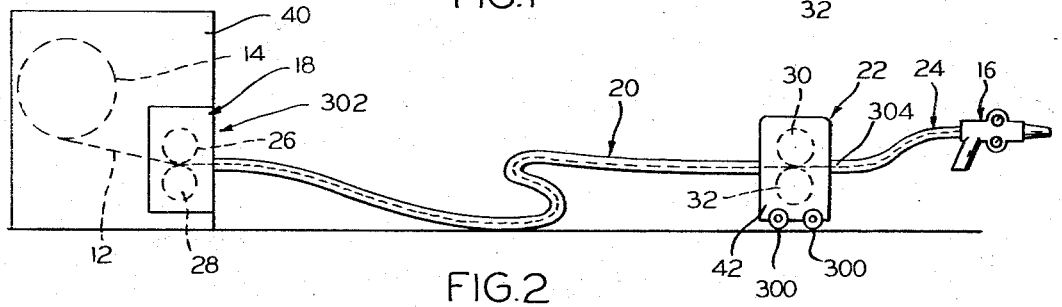
FIGURE 2 is a view similar to that of FIGURE 1, but more specifically illustrating the basic components of the invention.
Figure 3:
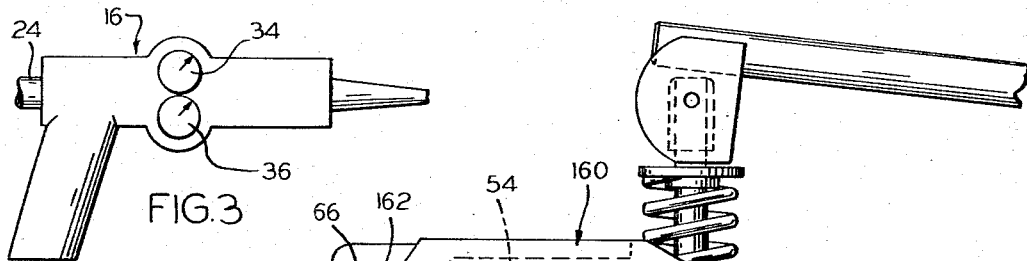
FIGURE 3 is an enlarged side elevational view of the welding gun shown in FIGURES 1 and 2, illustrating a specific feature of this invention.

FIGURE 2 diagrammatically illustrates a specific application of this invention wherein the welding wire storage reel and drive arrangement 18 are shown secured to the conventional welding machine 40 (illustrated in block diagram form) while the drive assembly 22 is shown incorporated in a wheeled housing 42 (that alternately may be of streamlined contour) that may be moved about at will be the operator in manipulating the gun 16. The guide conduit 20 is assumed to have a length on the order of 100 feet and it should be relatively flexible so that the operator can move at will within a radius of approximately 100 feet of the welding machine.

Figure 4:
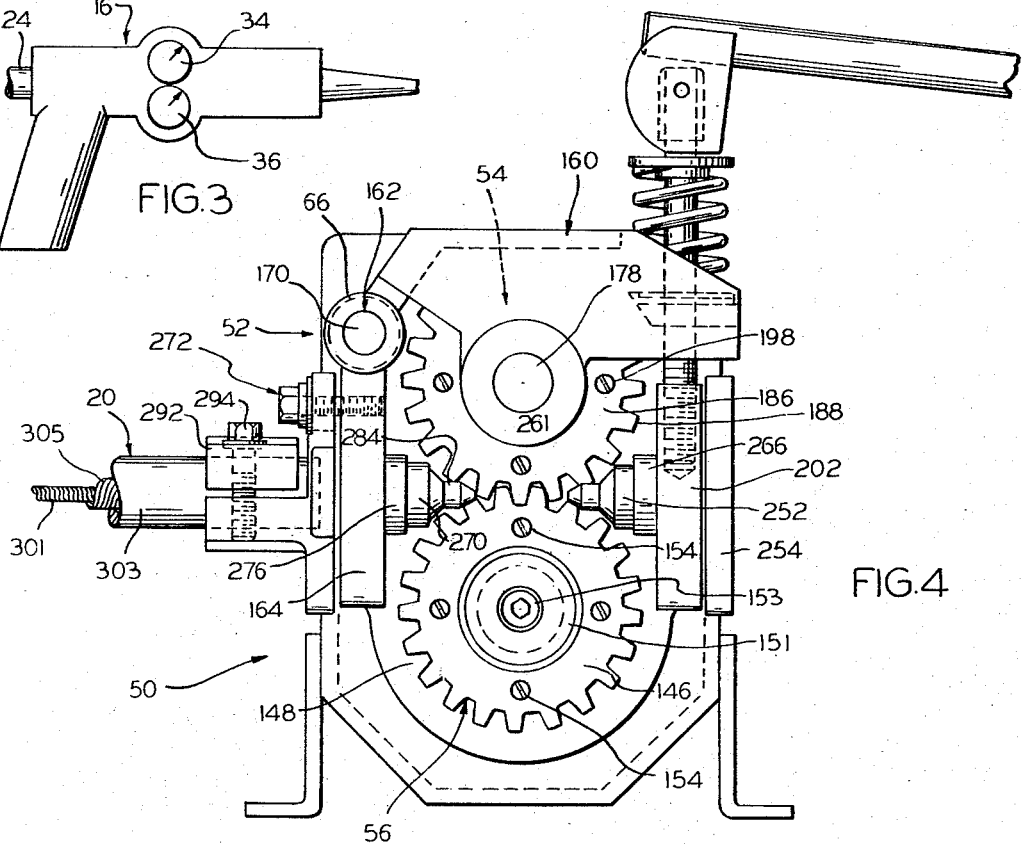
FIGURE 4 is an enlarged near side or front elevational view of a specific welding wire drive assembly, the basic features of which may be employed for either of the drive assemblies shown in FIGURE 2 except for the type of motor.
Figure 7:
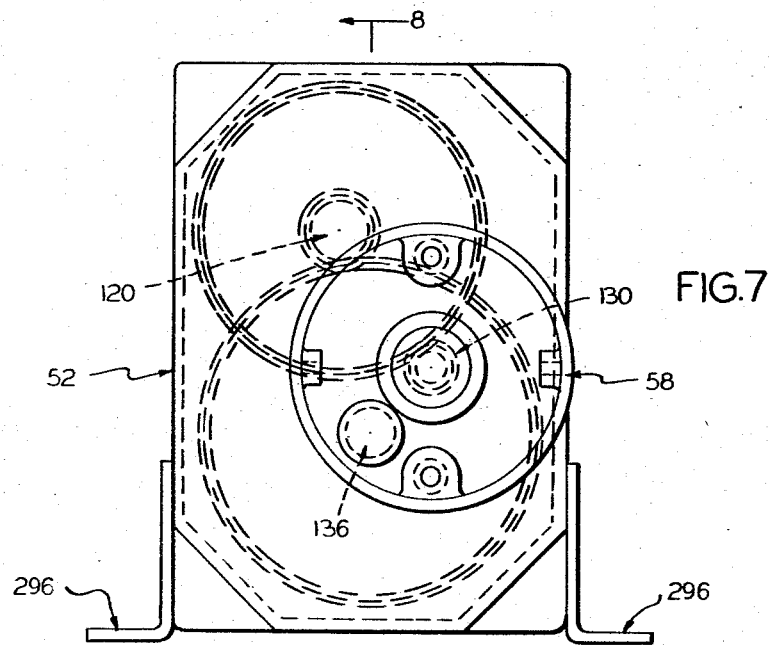
FIGURE 7 is a far side or rear elevational view of the device shown in FIGURES 4 and 5.
Figure 9:
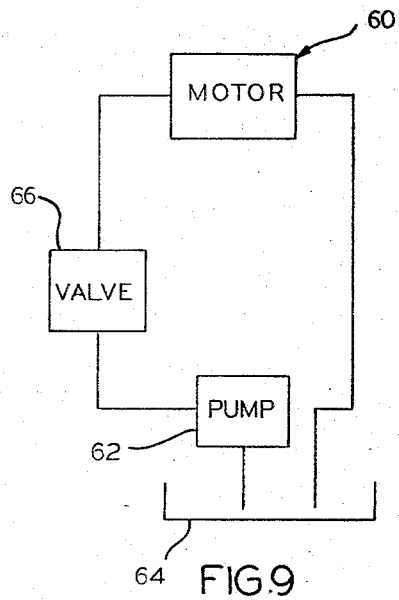
FIGURE 9 is a diagram illustrating a hydraulic motor drive arrangement for the pusher welding wire drive assembly shown in FIGURES 1 and 2.
Figure 10:
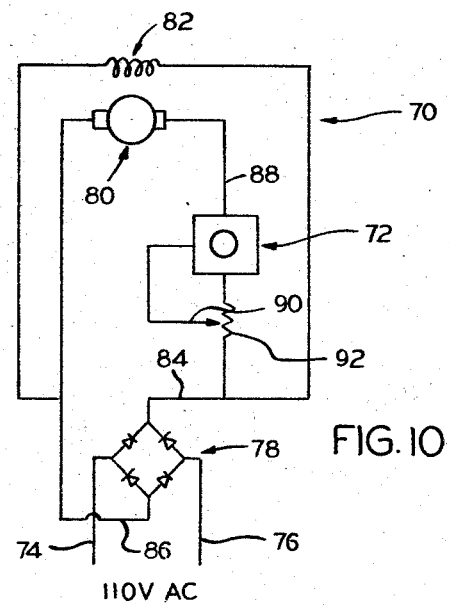
FIGURE 10 is a wiring diagram illustrating an electric motor drive arrangement for the pusher drive assembly shown in FIGURES 1 and 2.
Figure 11:
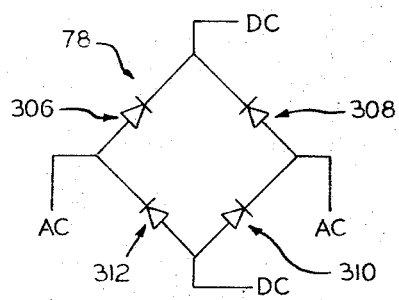
FIGURE 11 is a fragmental view on an enlarged scale of the bridge type rectifier shown in FIGURE 10.
Figure 12:
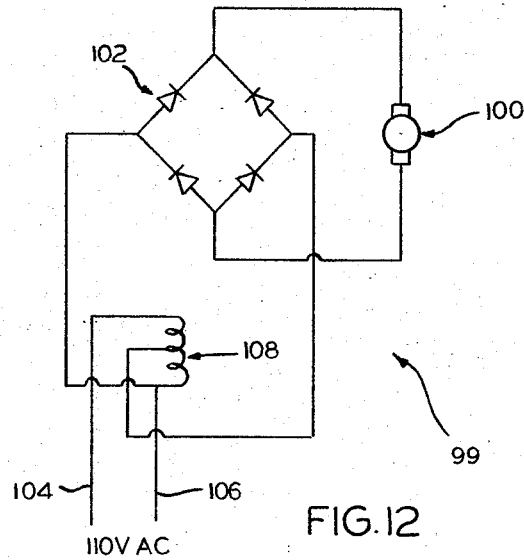
FIGURE 12 is a wiring diagram of an electric motor drive arrangement for the puller drive assembly shown in FIGURES 1 and 2.

FIGURES 4–6 illustrate the specifics of the welding wire drive roller arrangement that may be employed in either of the assemblies 18 or 22, while FIGURES 9–11 illustrate alternate motor drive arrangements for the pusher drive assembly 18. FIGURE 12 illustrates an electrical drive arrangement for the puller drive assembly 22.

The specific drive arrangement 50 of FIGURES 4–8 generally comprises a housing 52 journalling welding wire engaging drive rollers 54 and 56 which are driven by motor 58 (see FIGURES 5, 7 and 8) that is coupled to the drive rollers 54 and 56 through the gearing indicated in the drawings.

In the drive arrangement indicated in FIGURE 9, the motor 58 is a hydraulic motor 60 that is powered by a pump 62 drawing hydraulic liquid from the tank 64 and supplying it to motor 60 through constant pressure valve 66 of any conventional type that preferably may be adjusted to suit conditions. The function of valve 66 is to insure that the hydraulic liquid feed to motor 58 is supplied under constant pressure conditions.

The supplying of the hydraulic liquid under the conditions indicated to hydraulic motor 60 which forms the motor 58 when applied to the assembly 18 results in constant torque being available at the drive rollers 26 and 28 and when these rollers are clamped against the welding wire, a constant torque is applied to the welding wire 12, which pulls the wire 12 from its supply reel and pushes it into the adjacent portion of conduit 20.

Alternately, the motor 58 may take the form of the electric motor 70 that is diagrammatically illustrated in the form of the wiring diagram of FIGURE 10 in which the control device 72 of the DC motor 70 is incorporated in the armature circuit to insure that the armature 80 is provided with constant amperage which insures that the drive rollers 26 and 28 likewise will apply a constant torque to the welding wire. In this arrangement, AC power lines 74 and 76 are connected to a suitable form of bridge rectifier indicated at 78, with the armature 80 and field 82 of the motor 70 being connected in the manner indicated to the direct current leads 84 and 86 of the rectifier 78 (of course, the field alternately could be of the permanent magnet type). Control device 72 is incorporated in the lead 88 extending between the bridge rectifier 78 and armature 80 and includes an adjusting arm 90 cooperating with a rheostat 92 to adjustably control voltage drop across the armature and thereby control amperage through the armature. The device 72 may take the form of any conventional instrument that serves this purpose.

While the pusher assembly arrangement that is specifically disclosed provides a substantially constant push on the welding wire which varies only as the drawing action of the wire from its reel varies, if a more refined constant push on the wire is desired this can be done by using a transducer that measures the force under which the wire is being forced into the conduit 20, which transducer would be electrically connected into the circuiting of motor 58 to vary the amperage as required to maintain a constant push on the wire.

In the motor control arrangement of FIGURE 12 for the puller drive assembly 22, the motor 99 that serves as motor 58 may be a DC motor in which its armature 100 receives its current from bridge type rectifier indicated at 102 and that is in turn connected to AC power lines 104 and 106 through variable auto transformer 108. The variable auto transformer preferably is controlled by a suitable hand operated knob on the housing for the assembly 22 or by a control knob 34 applied to the gun 16 so that the welding gun operator can control the rate of welding wire feed at or near his welding position.

The arrangement indicated in FIGURE 12 permits the operator to adjust the voltage supplied to the motor 99 by adjusting the auto transformer 108.

It will thus be seen that our dual welding wire drive arrangement effects the feed of welding wire over long distances by providing a pusher drive assembly which applies a constant torque or nearly constant pushing action to the welding wire at one end of the distances to be spanned, and which provides a puller driving action at the other end of the distance to be spanned that controls the feed rate of the welding wire. Where a truly constant pushing action on the wire is desired, this can be achieved in the manner indicated although a constant torque drive provides a substantially constant push on the wire for all practical purposes.

This combination of drive assemblies provides for the first time a welding wire feed arrangement that is capable of feeding welding wires through flexible insulating conduits 20 that may have a length of 100 feet or more. Thus, our invention greatly extends the working area permitted to the operator of semi-automatic welding equipment.

*Specific description*

The welding machine 40 may be of any conventional type now available from any one of a number of welding equipment manufacturers. Such apparatus ordinarily provides the source of electrical power for the welding operation and has secured thereto a reel 14 for forming the source of supply of the welding wire 12.

The welding gun 16 may also be of any conventional type except that we prefer to have the hand manipulatable dials 34 and 36 applied thereto together with appropriate wiring for controlling the speed of operation of the drive assembly 22 and the welding voltage, as previously indicated. Gun 16 ordinarily will also include appropriate conduiting and the like for receiving flux, gas and coolant, depending upon the particular type of welding method that is to be employed.

The specific drive arrangement 50 further comprises a spindle 120 (see FIGURES 7 and 8) journalled by appropriate bearings 122 and 124 (see FIGURE 8) within the housing, and the spindle 120 is provided with a gear 126 (see FIGURE 8) that is driven by the motor used as motor 58 (through the gear generally indicated at 130 in FIGURE 7); spindle 120 also includes gear 132 which meshes with a gear 134 of a spindle 136 journalled in the housing by appropriate bearings 138 and 140. The spindle 136 includes a stub portion 142 having received thereon a hub 144, which, in accordance with this invention, is formed from a suitable electrically insulating material, such as Delrin or nylon; hub 144 includes a radially extending flange portion 146 which has its periphery formed with gear teeth as at 148; and thus flange portion 146 and its teeth 148 have electrically insulating qualities. The hub 144 is keyed to stub portion 142 by a key 150, and is held in place on stub portion 142 by a cap 151 secured against hub 144 by suitable screw 153.

A hardened welding wire engaging drive ring 152 that is formed from appropriate tool steel or the like is secured to the hub flange portion 146, as by appropriate screws 154 (although rivets or a suitable adhesive would be satisfactory). Thus, ring 152 and screws 154 are electrically insulated from the remainder of drive arrangement 50 by the insulating nature of hub 144 and its flange portion 146. The ring 152 has its periphery 156 formed with a groove 158 in which the welding wire is disposed when the assembly 50 is in operation.

The assembly 50 also includes a swing arm structure 160 positioned above the hub 144, which is hinged as at 162 to the housing for pivotal movement about an axis that is parallel to the axis of rotation of the hub 144 and its drive ring 152. The housing 52 includes a laterally extending arm 164 (see FIGURE 4) which has upstanding eyes 166 and 168 (see FIGURE 5) that are adapted for alignment with the eye portion 170 of the swing arm structure 160 to receive pivot pin 171 that pivotally connects the two structures together.

The swing arm structure 160 is generally channel shaped in transverse cross-sectional configuration (see FIGURE 8) and comprises a roof or web portion 172 and depending wall portions 174 and 176 in which is mounted a shaft member 178 fixed against rotation by set screw 180, on which is mounted a suitable bearing assembly 182 that journals a hub 184, which, in accordance with this invention is also formed from an electrically insulating material similar to that of hub 144; hub 184 includes a radially extending flange portion 186 having its periphery formed with gear teeth as indicated at 188 which are intended to mesh with the gear teeth 148 of hub 144. Thus, the flange portion 186 of hub 184 and its teeth 188 have electrical insulating qualities.

In practice, it is preferred that the hub 148 be formed from nylon, and that the hub 144 be formed from Delrin, or vice versa, as the coefficient of friction at the engaging parts of teeth 148 and 188 is less than it would be if the hubs 144 and 184 were both formed from either Delrin or nylon, although one or the other of the latter choices would provide an arrangement that would operate satisfactorily.

The hub 184 has a hardened metal drive ring 196 that is comparable to the drive ring 152 secured to its flange portion 186 by appropriate screws 198 (although, again, rivets or a suitable adhesive would be satisfactory), and the ring 196 has a groove 199 formed in its periphery 200 which is adapted to receive the welding wire during operation of the assembly 50. As in the case of drive ring 152, drive ring 196 and its screws 198 are electrically insulated from the remainder of drive arrangement 50 by the insulating nature of hub 184 and its flange portion 186, and thus the meshing teeth 148 and 188 are free from current conduction.

We have found that, for best results, drive rings 152 and 196 should have an external diameter at least on the order of two inches to best apply the feeding action to the wire that is contemplated by this invention (although smaller diameter rollers will work satisfactorily), and that the respective grooves 158 and 199 should be sufficiently less than half circles in transverse cross-sectional configuration to permit adequate pressure application to the wire without bringing the rings 152 and 196 in contact. In accordance with this invention, grooves 158 and 199 are smooth throughout their circumferences and this is important as its avoids permanent deformation of the welding wire and the formation of chips that would foul the drive assembly.

Figure 8:
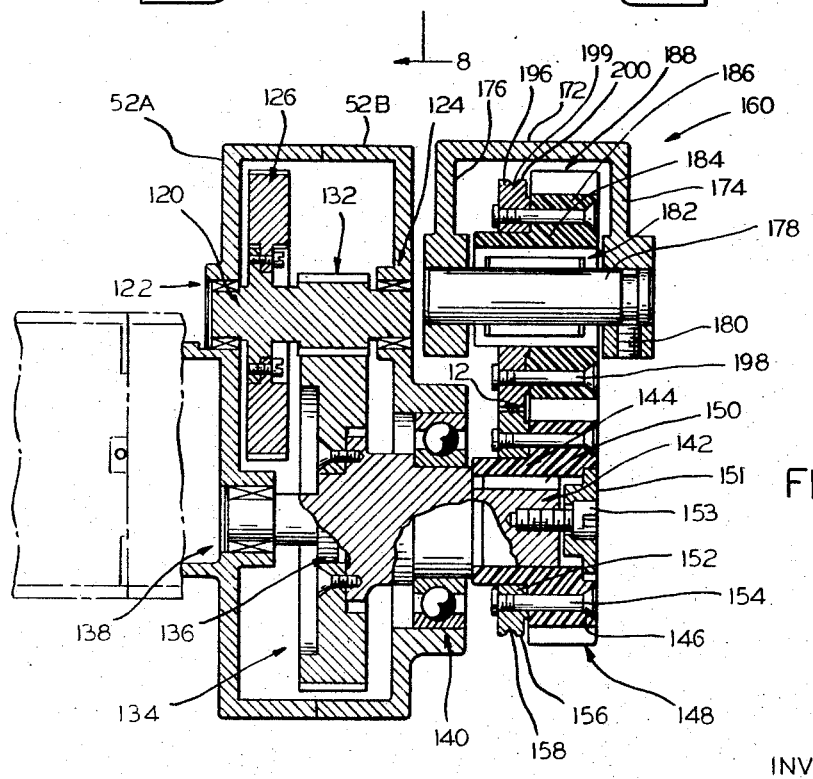
FIGURE 8 is a cross-sectional view substantially along line 8—8 of FIGURE 7.

As indicated in FIGURE 8, the drive rings 152 and 196 are in adjacent coplanar relation and when the swing arm 160 is in the operating position of the device, the drive rings are to have the closely spaced relation indicated in FIGURE 8. Grooves 158 and 199 of the respective rings should be proportioned to substantially complement the external surface of the wire 12 that is to be fed, and sets of rings 152 and 196 may be provided for handling welding wires of different sizes and shapes.

The housing 50 also includes a laterally extending arm or extension 202 having a threaded bore 204 (see FIGURE 6) formed therein in which is received an upstanding bolt 206 that extends through a web 208 of the swing arm that connects the depending portions 174 and 176 thereof together, and which forms a spring seat 210 through which the bolt 206 extends. Seated on the spring seat 210 is a washer 212 on top of which is seated a compression spring 214 which carries an upper spring seat 216. The bolt 206 at its upper end 218 is threaded and receives an internally threaded sleeve member 220 which has pivotally connected thereto by pin 222 a handle device generally indicated at 224, which comprises an operating handle 226 having a pair of plate elements 228 affixed as by welding to either side thereof through which the pin 222 passes. The plate elements 228 are each formed with identical curvilinear surfaces 230 and rectilinear surfaces 232. The surfaces 230 and 232 are proportioned so that when the surface 232 is in engagement with the planar upper surface 234 of spring seat 216, the drive ring 196 is firmly locked against the welding wire 12 (surfaces 232 and 234 are shown slightly spaced in FIGURES 4 and 6 for purposes of clarity of illustration). The surfaces 230 are proportioned to curve between the maximum position of surface 232 from axis of pivotal movement 236 of handle structure 224 to the position 240 along such surfaces 230 in which the minimum point from axis 236 is reached. In other words, the surfaces 230 at point 240 are at shorter distance from the axis 236 than the surface 232 is, with the result that as the handle structure 224 is moved approximately 90 degrees counterclockwise from the position of FIGURE 6, the drive ring 196 will not have spring pressure applied thus releasing the welding wire or providing space for insertion of the welding wire, whatever the case may be. Movement of the handle structure clampingly biases the drive rings toward the welding wire which is between them.

The extension 202 of the housing is also formed with opening 242 to receive locking pin 244 that passes through bolt 206 and extension 202 for the purpose of keying the latter against rotation in the recess 204.

Extension 202 is further formed with opening 250 which receives a hub shaped member 252 formed with a radially extending flange portion 254 through which appropriate bolts (not shown) are applied to secure the hub shaped member 252 to the housing. The hub shaped member 252 is formed with a bore 256 (see FIGURE 6)

that is counterbored and tapped as at 258 to receive the threaded end portion 260 of the tubular welding wire guide 261 which has its projecting end portion 262 formed with a bore 264 that substantially complements the diameter of the welding wire being fed by the assembly 50. Appropriate insulating material 266 is applied between the hub member 252 and the housing extension 202, as indicated in FIGURE 6.

The housing extension 164 has a similar hub shaped member 270 secured thereto by appropriate bolts (one of which is indicated at 272 in each of FIGURES 4 and 6), it being understood that the bolts for the hub member 252 are similarly arranged. Appropriate insulating material indicated at 274 is interposed between the bolts 272 and the hub shaped member 270 (this also applies to the bolts of member 252) and appropriate insulating material 276 is interposed between the hub shaped member 270 and the housing extension 164. Hub member 270 includes a tab 275 to which the current supplying cable from the welding machine may be attached in any suitable manner. Alternately, this tab may be incorporated in a special fitting applied to the cable end, in which case hub member 270 may be formed from an electrically insulating material (such as Delrin or nylon), thus eliminating the need for insulation 276 and 274; hub 252 may also be formed from an electrically insulating material (such as Delrin or nylon), thus eliminating insulation 266.

The hub shaped member 270 is formed with a bore 278 that is counterbored and tapped as at 280 to receive the threaded end portion 282 of tubular welding wire guide member 284, which has its projecting end portion 285 formed with a bore 286 which is proportioned to substantially complement the diameter of the welding wire that is to be fed by the device 50.

It will be noted from the showing of FIGURE 6 that the guide members 261 and 284 are in axial alignment and have their projecting end portions 262 and 285 in opposed relation.

The hub shaped member 270 includes an outwardly projecting arcuate extension 290 that receives one end of the tubular guide 20, with this end of the tubular guide being clamped in place by bolting a clamping member 292 to the extension 290 as by employing appropriate bolts 294.

The particular type of motor that serves as motor 58 may be affixed to the housing at its rear side in any suitable manner.

The housing 52 may also be provided with suitable bracing structures 296, and in the for shown, housing 52 comprises two halves 52A and 52B secured together by appropriate bolts 298.

The drive arrangement specifics that are shown in FIGURES 4-8 may be employed to construct either of the drive assemblies 18 or 22, with the motor arrangement that is appropriate for the assemblies 18 or 22 being employed as the motor 58.

In the case of the puller drive arrangement 22, the housing 52 may be provided with floor engaging rollers 300 of any suitable type. Also, the housing 52 may alternately be covered by a sheet metal shroud of streamlined shape to facilitate movement of arrangement over the welding area.

The tubular conduit 20 may be constructed in a manner similar to known devices of this type except that in accordance with our invention the conduit may have a length up to about 100 feet or more. Ordinarily conduits of this type comprise a wire of a relatively thick gauge in the form of a helix 301 defining a bore through which the welding wire passes, which helix is heavily covered with suitable insulating material 303. Where the welding gun is to receive its supply of electrical power from the welding machine, the conduit will also have wrapped about the helix the electrical conductors in the form of copper wiring 305 that carry the welding current.

The conduit 20 has its ends connected to the respective assemblies 18 and 22 in a similar manner, and the showing of FIGURE 4 may represent how the conduit 20 is secured to both drives.

An assembly 50 may be employed in the form shown in FIGURES 4-8 as the assembly 18 and as such may be secured in any suitable manner to welding machine 40 where indicated at 302.

A second assembly 50 may be adapted as assembly 22 by substituting a second hub shaped member 270 for the hub shaped member 252 so that the welding wire guide 24 may have its end portion 304 secured to the puller drive assembly 22 in the manner shown in FIGURE 4 in connection with conduit 20.

Th hub shaped member 252 is employed in the pusher drive assembly 18 and receives the welding wire directly from reel 14.

In the showing of FIGURE 11, the bridge type rectifier 78 is shown as employing suitable diodes where indicated at 306, 308, 310 and 312 to serve the usual rectifying functions in the manner indicated by the symbols employed in FIGURE 11.

It will therefore be seen that we have provided a drive arrangement for feeding welding wire which for the first time frees the operator of semi-automatic welding equipment from the severe limitations as to freedom of movement with respect to welding machines that have been imposed by conventional apparatus of this type.

It will also be seen that the arrangement we have provided for achieving this end comprises drive devices that are simplified and efficient in operation. The drive ring mounting and driving arrangement shown in FIGURES 4-8 greatly simplifies the manufacture and assembly of devices of this type.

The drive arrangement 50 may be adapted to drive a single welding wire 12, as in the specific embodiments illustrated, or it may be adapted for driving two or more welding wires by adding to the assembly in any suitable manner corresponding sets of the drive rollers and their associated components that are herein-disclosed.

The foregoing description and the drawings are given merely to explain and illustrate our invention and the invention is not to be limited thereto, except insofar as the appended claims are so limited, since those skilled in the art who have our disclosure before them will be able to make modifications and variations therein without departing from the scope of the invention.

We claim:

1. A device for feeding welding wire from a point of supply to a remote point of use, said device comprising:

a pair of wire feed drive assemblies each including means for feeding welding wire lengthwise thereof, and conduit means for connecting said drive assemblies together to provide a continuous feed path for the wire having an intake end at one of said assemblies and a discharge end at the other of said assemblies, said one assembly being located adjacent the point of supply and including means for applying a constant force pushing action on the wire that is independent of speed, and said other assembly being located adjacent the point of use and including means for controlling the speed of the wire feed through said feed path and means for selectively varying said feed speed, whereby said one assembly means applies a constant force pushing action on the wire for all feed speeds provided by said other assembly, and said other assembly controls the rate of the wire feed to said point of use.

2. A tandem welding wire feed device for feeding welding wire from a source of supply to a welding gun remote, from the source of supply, said device comprising:

a pusher drive assembly located adjacent the source of supply, a puller drive assembly located adjacent the welding gun, flexible welding wire conduit means for connecting said drive assemblies in series to provide a continuous feed path for the welding wire, said pusher drive assembly including means for applying a constant pushing action on the wire that is independent of speed, means for adjusting said pushing action quantitatively, and said puller drive assembly including means for controlling the speed of wire feed through said feed path and means for selectively varying said feed speed, whereby said pusher drive assembly means applies a constant force pushing action on the wire for all feed speeds provided by said puller drive assembly, and said puller drive assembly controls the wire feed rate to the gun.

3. A tandem feed device for feeding welding wire for semi-automatic welding equipment from a source of supply to a welding gun remote from the source of supply, said device comprising:

a pusher drive assembly located adjacent the source of supply and including a pair of opposed wire engaging rollers, a puller drive assembly located adjacent the welding gun and including a pair of opposed wire engaging rollers, elongate flexible welding wire conduit means for connecting said drive assemblies in series to provide a continuous feed path for the welding wire between said assemblies, said pusher drive assembly being adjacent the entrance end of said conduit means, and said puller drive assembly being adjacent the exit end of said conduit means, said pusher drive assembly including means for driving said rollers thereof to apply a constant torque to the welding wire independent of speed of feed, and said puller drive assembly including means for driving said rollers thereof to control the speed of wire feed through said feed path and means for selectively varying said feed speed, whereby said pusher drive assembly applies a constant force pushing action on the wire for all feed speeds provided by said puller drive assembly, and said puller drive assembly controls the rate of wire feed to the gun.

4. The device set forth in claim 3 wherein:

said conduit means has a length in the range of from about 50 to about 100 feet in length.

5. The device set forth in claim 3 wherein said pairs of rollers each comprise:

a pair of hubs formed from electrically insulating material and journalled for rotation about substantially parallel axes, said hubs each defining a radially outwardly extending electrically insulating flange portion, and a hardened welding wire engaging drive ring made fast to the flange portion of each of said hubs, with the drive rings of each of said assemblies being in coplanar relation and oriented to clampingly engage the welding wire, and said flange portions being formed with gear teeth that are disposed in meshing relation.

6. The device set forth in claim 5 wherein each of said assemblies includes means for resiliently clamping the drive rings thereof against a welding wire.

7. The device set forth in claim 3 wherein said driving means of said pusher drive assembly comprises:

a hydraulic motor coupled to said rollers of said pusher drive assembly, and means for supplying hydraulic liquid to said motor under constant pressure conditions for driving said motor, said hydraulic liquid supply means including means for adjusting the pressure of the hydraulic liquid being supplied.

8. The device set forth in claim 3 wherein said driving means of said pusher drive assembly comprises:

electric motor means coupled to said rollers of said pusher drive assembly, and means for connecting said motor to a source of electrical power, said connecting means including means for adjustably maintaining the power supplied to said motor under constant amperage conditions.

9. The device set forth in claim 3 wherein said driving means for said puller drive assembly comprises:

electric motor means coupled to said rollers of said puller drive assembly, and means for connecting said motor to a source of electrical power, said connecting means including means for adjusting the voltage supplied to said motor to vary the speed of said motor.

10. A welding wire drive assembly comprising:

a housing, a first hub formed from electrically insulating material journalled in said housing, a swing arm pivotally connected to said housing for pivotal movement with respect thereto about an axis paralleling the axis of rotation of said hub, a second hub formed from electrically insulating material journalled on said swing arm for rotation about an axis paralleling said axis of said first hub, said hubs each defining a radially outwardly extending electrically insulating flange portion, and a hardened welding wire engaging drive ring made fast to the flange portion of each of said hubs, said rings being in coplanar relation and disposed adjacent each other, said rings each being formed with a welding wire receiving groove about their peripheries, said grooves being in coplanar relation, said flange portions being formed with gear teeth that are in meshing relation, means for releasably biasing said second hub drive ring toward said first hub drive ring whereby said grooves define a welding wire feed path between said hubs, and means for rotating said hubs in opposite directions about their respective axes.

11. The assembly set forth in claim 10 wherein:

said housing at either end of said feed path having a welding wire guide tube secured thereto and aligned with said feed path, said tubes each being mounted in a flange hub member, bolt means for securing said hub members to said housing through their flanged portions, and insulating means interposed between said hub members and said housing.

12. The assembly set forth in claim 11 wherein said releasable biasing means comprises:

a stud member mounted in said housing above one of said hub members, said swing arm pivotal axis being disposed above the other of said hub members, said swing arm being formed with a spring seat above said one hub member and said stud extending through said spring seat, compression spring means on said spring seat about said stud member, a washer received on said stud member on said spring means, a handle swingably connected to the upper end of said stud member, and cam lock means cooperating between said handle and said washer for biasing said second hub drive ring against said first hub drive ring.

13. In a welding wire drive assembly including a pair of drive rollers adapted to be placed in pinching relation with a welding wire to provide a purchase on same to feed the wire lengthwise thereof, the improvement wherein said rollers each comprise:
   a rotatably mounted hub formed from electrically insulating material,
   and a hardened metal drive ring keyed to said hub for rotation therewith in electrically insulating relation to said assembly,
   said rings being in coplanar relation and being formed with coplanar grooves that complement the exterior of the wire,
   said hubs each including gear teeth that are in meshing relation,
   one of said hubs being formed from Delrin,
   and the other of said hubs being formed from nylon.

14. In a tandem feed device for feeding welding wire for semi-automatic welding equipment from a source of supply to a welding gun remote from the source of supply, wherein said device includes a pusher drive assembly including a pair of opposed wire engaging rollers, a puller drive assembly including a pair of opposed wire engaging rollers, elongate flexible welding wire conduit means for connecting said drive assemblies in series to provide a continuous feed path for the welding wire between said assemblies, with said pusher drive assembly being adjacent the entrance end of said conduit means, and said puller drive assembly being adjacent the exit end of said conduit means, the improvement wherein:
   said puller drive assembly includes means for driving said rollers thereof to control the speed of wire feed through said feed path and means for selectively varying said feed speed, and
   said pusher drive assembly includes means for driving said rollers thereof to apply a substantially constant pushing action on the welding wire for the feed rate variations provided by said puller drive assembly.

15. The improvement set forth in claim 14 wherein said conduit means has a length in the range of from about 50 to about 100 feet in length.

References Cited

UNITED STATES PATENTS

| | | | |
|---|---|---|---|
| 1,927,896 | 9/1933 | Meller | 314—72 |
| 2,432,495 | 12/1947 | Baird | 219—125 |
| 2,484,421 | 10/1949 | Moore | 219—132 X |
| 2,606,267 | 8/1952 | McElrath | 219—130 |
| 2,719,245 | 9/1955 | Anderson | 314—69 |
| 2,790,925 | 4/1957 | Landis et al. | 314—69 |
| 2,806,125 | 9/1957 | Miller | 219—130 |
| 2,900,488 | 8/1959 | Bassot | 219—130 |
| 3,293,477 | 12/1966 | Lobosco | 314—69 |

FOREIGN PATENTS

| | | |
|---|---|---|
| 1,261,664 | 4/1961 | France. |

OTHER REFERENCES

German Printed Application 1,099,666, Feb. 16, 1961.

RICHARD M. WOOD, *Primary Examiner.*